United States Patent [19]

Arai

[11] Patent Number: 4,460,740
[45] Date of Patent: Jul. 17, 1984

[54] METHOD FOR PREVENTING SURFACE STAIN OF CURED SILICONE SEALANT

[75] Inventor: Masatoshi Arai, Gunma, Japan

[73] Assignee: Shin-Etsu Chemical Co., Ltd., Tokyo, Japan

[21] Appl. No.: 476,550

[22] Filed: Mar. 18, 1983

[30] Foreign Application Priority Data

Mar. 26, 1982 [JP] Japan .................................. 57-48227

[51] Int. Cl.$^3$ .............................................. C08K 5/16
[52] U.S. Cl. .................................... 524/724; 524/720; 524/723; 528/33; 528/34; 528/901
[58] Field of Search ......................... 528/33, 34, 901; 524/720, 723, 724

[56] References Cited

U.S. PATENT DOCUMENTS

| | | | |
|---|---|---|---|
| 3,393,164 | 7/1968 | Braun | 528/901 |
| 3,706,695 | 12/1972 | Huebner et al. | 528/901 |
| 4,026,845 | 5/1977 | Kim et al. | 528/901 |

*Primary Examiner*—Melvyn I. Marquis
*Attorney, Agent, or Firm*—Toren, McGeady and Stanger

[57] ABSTRACT

The invention provides a novel means for solving the serious problem in conventional silicone sealant compositions that the surface of the cured sealant composition, when used for sealing or caulking of a joint in building structures of, in particular, stony components, is susceptible to stain from environmental atmosphere eventually spreading over the adjacent surfaces. The invention proposes admixing a limited amount of a specific fluorine-containing surface active agent with the silicone sealant composition before it is applied for sealing or caulking.

3 Claims, No Drawings

METHOD FOR PREVENTING SURFACE STAIN OF CURED SILICONE SEALANT

BACKGROUND OF THE INVENTION

The present invention relates to a novel method for preventing surface stain of a cured silicone sealant and a room temperature-curable organopolysiloxane sealant composition or, more particularly, to an organopolysiloxane composition capable of giving a cured rubbery product at room temperature which is outstandingly resistant to or insusceptible to surface stain.

In the prior art, there are known several types of organopolysiloxane compositions curable at room temperature into a rubbery elastomer. The cured rubbery elastomers of these room temperature-curable organopolysiloxane compositions have excellent weathering resistance, durability, heat resistance, antifreeze resistance and the like properties irrespective of the types of the compositions which may be cured by several different mechanisms in comparison with other organic rubbers so that they are widely used in various fields of applications. In particular, their demand in the building industry is rapidly growing as an adhesive for glass-to-glass adhesion or for glass-to-metal adhesion as well as a caulking material in the joints between concrete parts. Such a room temperature-curable organopolysiloxane composition capable of giving a cured rubbery elastomer having a relatively small elastic modulus and large elongation is generally called a "silicone sealant" and used for caulking or sealing of joints between large building components unavoidably subjected to a considerably large relative movement.

Apart from the above mentioned advantages possessed by the silicone sealants, a problem in them is the susceptibility of their cured rubbery elastomer to surface stain. That is, the organopolysiloxane as the main component of the silicone sealant is electrically insulating and responsible to the high susceptibility of the surface of the cured elastomer thereof to electric charging or accumulation of static electricity so that dusts or other dirty matters in the atmospheric air are readily attracted to the thus charged surface resulting in the loss of pleasant appearance on the surface within a relatively short period of time. This problem is particularly serious when a room temperature-curable silicone sealant formulated in two packages containing different components to be mixed together directly before use and capable of giving a cured elastomer having a very low modulus and large elongation is used for caulking of joints between stony parts of natural stones or rocks such as granitic rocks and marble stones because the surface stain is not limited to the surface of the cured silicone sealant in the joint but spreads over the adjacent surfaces of the stony parts therearound.

Several attempts have been made to solve the above problem by formulating the silicone sealant with a surface active agent having polyoxyethylene groups, sorbitan residues or disaccharide residues in the chemical structure as is proposed, for example, in Japanese Patent Kokai No. 56-76453. The addition of a surface active agent of the above mentioned type in the silicone sealant is indeed effective to some extent but satisfactory effects of reduction of surface stain are obtained only by the addition of a surface active agent in a large amount which in turn leads to the decrease of adhesion as is the primarily important requirement for sealants or caulking materials. Thus no satisfactory silicone sealants have been available in the prior art in this connection of surface stain.

SUMMARY OF THE INVENTION

An object of the present invention is therefore to provide a novel and improved means for preventing stain of not only the surface of a cured silicone sealant composition but also of the surfaces adjacent thereto.

Another object of the present invention is to provide a novel and improved room temperature-curable organopolysiloxane composition useful as a silicone sealant capable of giving a cured rubbery elastomer which is highly resistant or almost insusceptible to the accumulation of stain not only on the surface of the cured silicone sealant per se but also on the surfaces of the adjacent parts thereto when the sealant is used as a caulking material in the joints of, for example, stony building components but still suffers no decrease in the adhesion.

The improvement proposed in the present invention with the above mentioned object of stain prevention comprises, in using a room temperature-curable silicone sealant composition comprising:

(a) 100 parts by weight of a diorganopolysiloxane blocked at both molecular chain ends each with a hydroxy group directly bonded to the silicon atom;

(b) from 0.1 to 25 parts by weight of an organosilicon compound having at least 2 hydrolyzable groups bonded to the silicon atoms per molecule on an average;

(c) from 1 to 400 parts by weight of a filler; and (d) optionally, up to 5 parts by weight of a curing catalyst, for sealing or caulking, admixing in advance (e) from 0.01 to 5.0 parts by weight of a surface active agent having, in a molecule, at least one fluorine atom with 100 parts by weight of the silicone sealant composition.

The room temperature-curable organopolysiloxane composition of the present invention comprises:

(a) 100 parts by weight of a diorganopolysiloxane blocked at both molecular chain ends each with a hydroxy group directly bonded to the silicon atom;

(b) from 0.1 to 25 parts by weight of an organosilicon compound having at least 2 hydrolyzable groups bonded to the silicon atoms per molecule on an average;

(c) from 1 to 400 parts by weight of a filler;

(d) optionally, up to 5 parts by weight of a curing catalyst, and (e) from 0.01 to 5.0 parts by weight, per 100 parts by weight of the total amount of the components (a) to (d) above, of a surface active agent having, in a molecule, at least one fluorine atom.

DETAILED DESCRIPTION OF THE PREFERRED EMBODIMENTS

It should be noted that, in the above described formulation, the components (a) to (c) and, optionally, (d) are rather conventional in formulating a room temperature-curable organopolysiloxane composition and the most characteristic component in the inventive composition is the fluorine-containing surface active agent as the component (e). Surface active agents of this specific type are indeed effective to prevent deposition of dusts and the like stain in the atmospheric air on to the surface of the cured silicone sealant composition in a joint and hence the surfaces adjacent to the joint filled with the sealant are also protected from stain.

The surface active agent as the component (e) should necessarily have at least one fluorine atom in a molecule and any one of the amphoteric, anionic, cationic and non-ionic surface active agents containing fluorine may be used. Following are several of the examples of the surface active agents suitable for use as the component (e) though not limited thereto.

The amphoteric surface active agents are exemplified by those represented by the following general formulas:

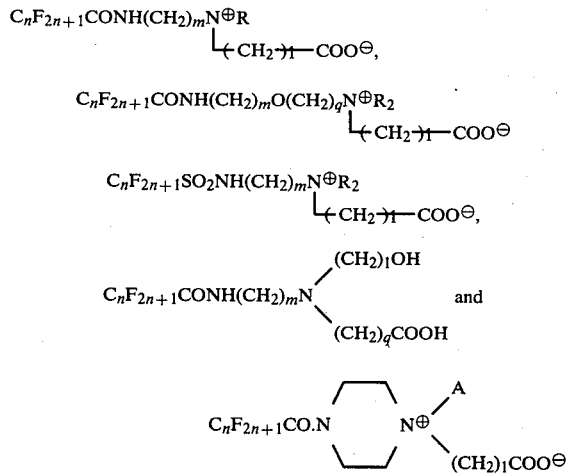

in which R is a monovalent organic group or, preferably, a monovalent hydrocarbon group, A is an alkyl group or a hydroxyalkyl group, l, m and q are each zero or a positive integer and n is a positive integer.

The anionic surface active agents are exemplified by those represented by the general formula $C_nF_{2n+1}SO_3M$ or $C_nF_{2n+1}COOM$, in which M is a hydrogen atom or an alkali metal atom and n is a positive integer, and the cationic surface active agents are exemplified by those represented by the general formula $C_nF_{2n+1}SO_2NH(CH_2)_mN^{\oplus}R_3X^{\ominus}$, in which X is a halogen atom and R, m and n each have the same meaning as defined above. Further, the non-ionic surface active agents are exemplified by those represented by the general formula $C_nF_{2n+1}SO_2NR(CH_2CH_2O)_pH$, in which p is zero or a positive integer and R and n each have the same meaning as defined above.

All of the fluorine-containing surface active agents described above are effective as the component (e) in the inventive composition for decreasing the surface stain but particularly preferable are the amphoteric surface active agents represented, more preferably, by the general formula

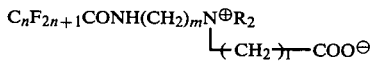

in which R, l, m and n each have the same meaning as defined above.

Following is a possible mechanism of the effectiveness of stain prevention obtained by the formulation of the above described specific surface active agents in the silicone sealant composition on the surfaces adjacent to the joint caulked with the silicone sealant. That is, it is now understood that the stain on the surfaces adjacent to the silicone-filled joint is caused presumably as a result of the migration of the non-reactive organopolysiloxane polymer toward the surface of the bodies adhesively bonded with the silicone sealant. On the other hand, the addition of a small amount of the specific fluorine-containing surface active agent in the silicone sealant is effective in increasing the wettability of the surface with water so that the dusts and other stains eventually deposited on the surface may be readily washed down with rain or sprinkling of water. Furthermore, the fluorine-containing surface active agent contained in the silicone sealant exhibits oil-repellency on the surface so that the migration or diffusion of the organopolysiloxane polymer from the silicone-filled joint to the adjacent surfaces is effectively prevented after exudation or bleeding on to the surface of the cured silicone sealant from the depth of the joint filled therewith.

On the contrary, no such oil-repellency is obtained by the addition of a conventional hydrocarbon-based surface active agent so that the above explained mechanism ascribable to the fluorine-containing surface active agent belongs to a novel and unexpected discovery and the effectiveness is presumably a result of the orientation of the molecules of the surface active agent to direct the fluorine-containing groups to the surface of the cured silicone sealant as a phenomenon characteristic to the surface active agent of such a type. Different from the conventional surface active agents which may adversely influence the adhesion of the silicone sealant admixed therewith to the bodies to be joined by the sealant, moreover, it is noteworthy that the adhesion of the silicone sealant is little affected by the addition of the above described specific surface active agent which is effective in exhibiting the desired effect of stain prevention even in a very small amount of addition.

Meanwhile, the fluorine-containing surface active agent as the component (e) in the inventive composition should preferably have an activity that the surface tension of an aqueous solution containing 0.01% by weight thereof is 60 dyne/cm or smaller at 25° C. The amount of this component (e) contained in the inventive composition should be, as is mentioned before, in the range from 0.01 to 5.0 parts by weight or, preferably, from 0.1 to 2.0 parts by weight per 100 parts by weight of the total amount of the components (a) to (d). This is because an amount smaller than 0.01 part by weight cannot impart satisfactory insusceptibility to stain to the silicone sealant composition while an amount of the surface active agent in excess of 5 parts by weight is undesirable due to the decreased adhesion of the cured rubbery elastomer to the substrate surface as well as unduly decreased hardness and poor mechanical strength of the cured sealant composition.

In the next place, the other components than the above described component (e), i.e. components (a) to (d), in the inventive composition are described in detail.

The component (a), which is a diorganopolysiloxane terminated at both molecular chain ends each with a hydroxy group directly bonded to the silicon atom, is well known in the art of silicones as a base material in room temperature-curable silicone rubber compositions.

The types of the organic groups bonded to the silicon atoms in this diorganopolysiloxane are not particularly limitative including alkyl groups such as methyl, ethyl, propyl and butyl groups, cycloalkyl groups such as cyclopentyl and cyclohexyl groups, alkenyl groups such as vinyl and allyl groups, aryl groups such as phenyl, tolyl and naphthyl groups, aralkyl groups such as 2-phenylethyl group and the like hydrocarbon groups as well as alkoxy groups such as methoxy, ethoxy and propoxy groups. The hydrogen atoms in these organic groups may be partly or wholly replaced with substituent atoms or groups such as halogen atoms, e.g. chlorine atoms, and amino groups.

The diorganopolysiloxane as the component (a) should have such a degree of polymerization that the viscosity thereof is in the range from 100 to 1,000,000 centistokes or, preferably, in the range from 1000 to 50,000 centistokes at 25° C. because no satisfactorily high mechanical strengths of the cured elastomer can be obtained with a silicone sealant composition formulated with a diorganopolysiloxane having a lower viscosity than above while workability of the silicone sealant composition is poor when it is prepared with a diorganopolysiloxane having a viscosity higher than above due to the excessively or unduly high consistency of the composition.

The organosilicon compound as the component (b) serves as a curing agent of the component (a) and should have at least two hydrolyzable groups bonded to the silicon atoms in a molecule on an average. Suitable hydrolyzable groups in this component (b) include, for example, acyloxy groups such as acetoxy, octanoyloxy and benzoyloxy groups, ketoxime groups such as dimethyl ketoxime, methyl ethyl ketoxime and diethylketoxime groups, alkoxy groups such as methoxy, ethoxy and propoxy groups, alkenyloxy groups such as isopropenyloxy and 1-ethyl-2-methyl vinyloxy groups, substituted amino groups such as dimethylamino, diethylamino, butylamino and cyclohexylamino groups, substituted aminoxy groups such as dimethylaminoxy and diethylaminoxy groups, amide groups such as N-methyl acetamido, N-ethyl acetamido and N-methyl benzamido groups and the like.

No particular limitation is given to the types of the organosilicon compound as the component (b) other than the above mentioned essential requirement for the at least two hydrolyzable groups per molecule on an average and the compound may of course have non-hydrolyzable groups bonded to the silicon atom or atoms. The organosilicon compound may be either an organosilane or an organopolysiloxane in the chemical structure and the molecular configuration of the compounds of the latter class, i.e. organopolysiloxane, may be straight-chained, branched or cyclic.

The above mentioned non-hydrolyzable organic groups which may be bonded to the silicon atom or atoms of the organosilicon compound as the component (b) include alkyl groups such as methyl, ethyl, propyl and butyl groups, cycloalkyl groups such as cyclopentyl and cyclohexyl groups, alkenyl groups such as vinyl and allyl groups, aryl groups such as phenyl, tolyl and naphthyl groups, aralkyl groups such as 2-phenylethyl group and the iminoalkyl groups expressed, for example, by the formulas $(CH_3)_2C=N-(CH_2)_3-$ and $(CH_3)(C_2H_5)C=N-(CH_2)_3-$ as well as those substituted groups obtained by the partial or total replacement of the hydrogen atoms in the above named groups with substitutent atoms such as halogen atoms, e.g. chlorine.

Several examples of the particularly suitable organosilicon compounds as the component (b) are the cyclic organopolysiloxane compounds expressed by the following formulas:

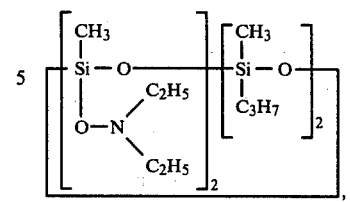

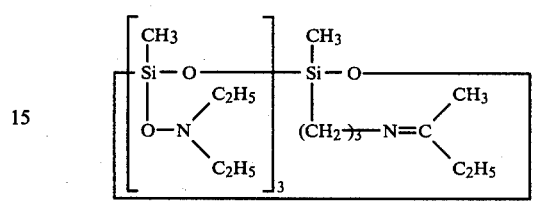

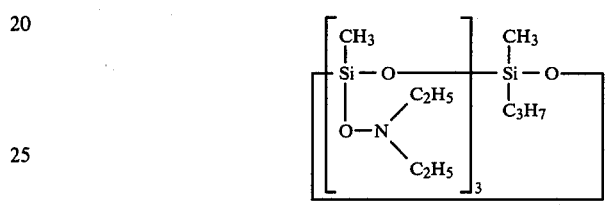

The above named organosilicon compounds as the component (b) may be used either alone or as a combination of two kinds or more according to need. The amount of the component (b) in the inventive composition should be in the range from 0.1 to 25 parts by weight or, preferably, from 2 to 10 parts by weight per 100 parts by weight of the component (a). This is because gelation sometimes takes place in a composition formulated with less than 0.1 part by weight of the component (b) during its preparation or in the course of storage so that a sealant composition having desired properties cannot be obtained while the component (b) in an amount in excess of 25 parts by weight results in an extremely decreased curing velocity of the composition in addition to the increased shrinkage of the composition by curing and the poor elasticity of the cured rubbery elastomer.

The component (c) is a filler including inorganic and organic ones exemplified by fumed silica, precipitated silica, quartz powder, diatomaceous earth, titanium dioxide, aluminum oxide, lead oxide, iron oxide, carbon black, bentonite, graphite powder, calcium carbonate, mica, clay, glass beads, glass microballoons, Shirasu balloons, glass fibers, beads of polyvinyl chloride resins, plystyrene beads, beads of acrylic resins and the like. The silica fillers may be modified on the surface by the treatment with hexamethyl disilazane or a cyclic dimethyl polysiloxane.

The amount of this component (c) in the inventive silicone sealant composition should be in the range from 1 to 400 parts by weight or, preferably, from 50 to 150 parts by weight per 100 parts by weight of the component (a). This is because the mechanical strength of the cured rubbery elastomer of the composition may be poor when the amount of the filler as the component (c) is smaller than above while an excessively large amount of the component (c) in the composition results in poor rubbery elasticity of the cured elastomer of the composition.

In the next place, various compounds known as the curing catalyst in the conventional room temperature-curable organopolysiloxane compositions are suitable as the component (d) in the inventive silicone sealant compositions including, for example, metal salts of carboxylic acids such as lead 2-ethylhexoate dibutyltin dioctoate, dibutyltin diacetate, dibutyltin dilaurate, butyltin 2-ethylhexoate, iron 2-ethylhexoate, cobalt 2-ethylhexoate, manganese 2-ethylhexoate, zinc 2-ethylhexoate, tin(II) caprylate, tin naphthenate, tin oleate, tin butyrate, titanium naphthenate, zinc naphthenate, cobalt naphthenate, zinc stearate and the like, organic titanate esters such as tetrabutyl titanate, tetra(2-ethylhexyl)titanate, triethanolamine titanate, tetra(isopropenyloxy)titanate and the like, organotitanium compounds such as titanium β-carbonyl and the like, alkoxy aluminum compounds, aminoalkyl-substituted alkoxy silanes such as 3-aminopropyl triethoxy silane, N-(trimethoxysilylpropyl)ethylenediamine and the like, amine compounds and salts thereof such as hexylamine, dodecylamine phosphate and the like, quaternary ammonium salts such as benzyl triethylammonium acetate and the like, alkali metal salts of lower carboxylic acids such as potassium acetate, sodium acetate, lithium oxalate and the like, dialkyl hydroxylamines such as dimethyl hydroxylamine, diethyl hydroxylamine and the like, guanidine compounds and guanidyl-containing silanes and polysiloxanes expressed, for example, by the following structural formulas:

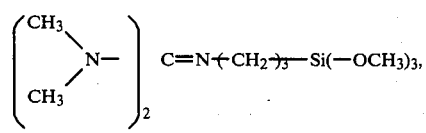

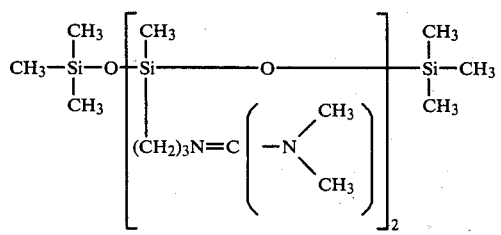

These curing catalysts may be used either alone or as a combination of two kinds or more according to need.

The curing catalyst as the component (d) is not essential in the inventive silicone sealant composition since the sealant composition may be curable even without the addition of any curing catalyst though dependent on the type of the organosilicon compound as the component (b) or, in particular, on the kind of the hydrolyzable groups bonded to the silicon atoms in this component (b). Usually, however, the curing catalyst is added to the inventive sealant composition in an amount from 0.01 to 5 parts by weight or, preferably, from 0.1 to 3 parts by weight per 100 parts by weight of the component (a) in order to adequately decrease the time taken for curing or to obtain uniform curing to the depth of a considerably thick layer of the sealant composition. Too much amounts of the curing catalyst are of course undesirable because of the too early surface filming on the composition to cause some inconvenience in the working therewith as well as the poor heat resistance and weathering resistance of the cured rubbery elastomer thereof.

The inventive silicone sealant composition can be prepared by merely admixing the fluorine-containing surface active agent with a composition composed of the components (a) to (d) uniformly. It is of course optional that all of the components are blended at one time. Any conventional blending machines may be used for the purpose. When necessary according to the nature of the curing agent or curing catalyst, it is optional that the inventive composition is prepared not as a ready-mixed composition in one package but two separate packages, one for the main components and the other for the curing agent and catalyst, for example, are prepared and the contents of the two packages are mixed together directly before the working with the completed composition.

The silicone sealant composition of the invention may further contain conventional additives used in similar compositions according to need including plasticizers, coloring agents, e.g. pigments, flame retardants, thixotropy-improvers, bactericide or fungicide agents and adhesion improvers which may be the so-called carbon-functional organosilanes having amino groups, epoxy groups, thiol groups and the like reactive groups in amounts not excessively large to decrease the excellent properties proper to the inventional sealant compositions.

In the following, examples are given to illustrate the present invention in further detail. In the examples, "parts" always refers to "parts by weight".

The experiments in the following examples were carried out by use of the surface active agents I to XI listed below including those containing fluorine for the present invention and those containing no fluorine for comparative purpose. In the formulas given in the following list for the surface active agents, the symbol Me denotes a methyl group.

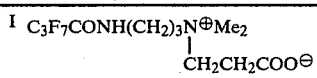

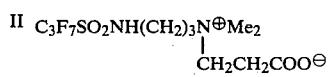

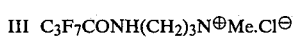

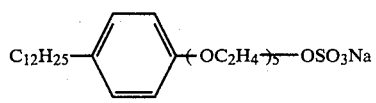

V Cetyl Trimethylammonium chloride
$C_{16}H_{33}N^{\oplus}Me_3 . Cl^{\ominus}$

VI Sorbitan monolaurate

VII Polyoxyethylene sorbitan monostearate

VIII 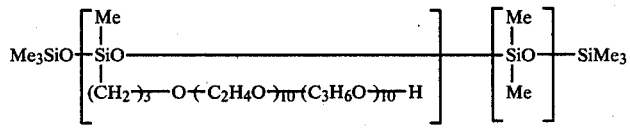

IX 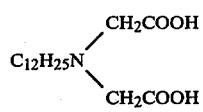

X $C_3F_7SO_2N.Me.(CH_2CH_2O)_2H$

XI 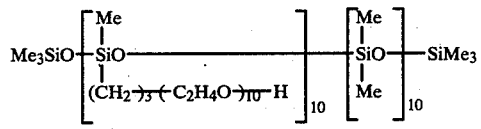

EXAMPLE 1

Silicone sealant compositions No. 1 to No. 19 were prepared each by uniformly blending 100 parts of a dimethylpolysiloxane terminated at both molecular chain ends with hydroxy groups each directly bonded to the terminal silicon atom and having a viscosity of 20,000 centistokes at 25° C., 10 parts of a fumed silica filler, 0.2 part of dibutyltin dioctoate, 5 parts of methyl tributanone oxime and a surface active agent of the kind indicated in Table 1 below in an amount also indicated in the table.

The above prepared silicone sealant compositions were cured at room temperature and subjected to the test for the susceptibility to stain on the surface of the cured rubbery elastomer in the following manner. Thus, two square plates of granitic rock each having dimensions of 300 mm × 300 mm × 15 mm were placed flat side by side to form an elongated gap of 15 mm width and the gap space of 300 mm length and 15 mm × 15 mm cross section was filled with one of the silicone sealants to be kept standing to allow the sealant becoming cured at room temperature into a rubbery elastomer.

The above prepared test specimen of two granitic rock plates bonded by the silicone sealant was exposed to the outdoor atmosphere for a duration of up to 6 months and the condition of surface stain on the surface of the cured sealant composition as well as the adjacent surfaces of the rock plates was examined visually after lapse of 1 month, 3 months and 6 months.

TABLE 1

| Composition No. | Surfactant, parts | | Surface stain after | | | Adhesion to | | | |
|---|---|---|---|---|---|---|---|---|---|
| | | | | | | glass | | aluminum | |
| | | | 1 month | 3 months | 6 months | initial | after dipping in water | initial | after dipping in water |
| 1 | I, | 0.1 | A | A | A | A | A | A | A |
| 2 | I, | 0.5 | A | A | A | A | A | A | A |
| 3 | I, | 1.0 | A | A | A | A | A | A | A |
| 4 | II, | 0.1 | A | B | C | A | A | A | A |
| 5 | II, | 0.5 | A | A | B | A | A | A | A |
| 6 | II, | 1.0 | A | A | B | A | A | A | A |
| 7 | III, | 0.1 | A | B | C | A | A | A | A |
| 8 | III, | 0.5 | A | B | B | A | A | A | A |
| 9 | III, | 1.0 | A | B | B | A | A | A | A |
| 10* | IV, | 1.0 | C | D | E | | | | |
| 11* | IV, | 5.0 | C | D | E | | | | |
| 12* | V, | 1.0 | C | D | E | | | | |
| 13* | V, | 5.0 | B | D | E | | | | |
| 14* | VI, | 1.0 | B | D | E | | | | |
| 15* | VI, | 5.0 | B | C | D | C | C | C | C |
| 16* | VII, | 1.0 | C | D | D | | | | |
| 17* | VII, | 5.0 | B | C | D | C | C | C | C |
| 18* | VIII, | 5.0 | A | B | C | B | C | A | B |
| 19* | IX, | 5.0 | C | D | E | C | C | C | C |

*Comparative example

The results were evaluated in 5 grades of A, B, C, D and E each corresponding to the state of (A) complete absence of surface stain, (B) clean appearance retained almost as before the test, (C) surface stain occurred though insignificantly, (D) considerable surface stain and (E) heavy surface stain, respectively.

Further, the strength of adhesive bonding with these silicone sealant compositions was examined on a glass plate or an aluminum plate as the substrate. Thus, each of the sealant compositions was spread on the substrate plate in a layer of 5 mm thick and kept standing at room temperature so as to cure the sealant composition into a rubbery elastomer bonded to the substrate surface.

The strength of adhesive bonding between the substrate surface and the cured layer of the sealant composition was examined either with the sealant composition as cured or after dipping thereof in water at 50° C. for 3 days. The results are given in Table 1 in 3 grades of A, B and C corresponding to the condition of (A) firm bonding, (B) adhesive bonding though with peelability when forcibly pulled apart and (C) poor adhesive bonding with readily peelable cured layer, respectively.

EXAMPLE 2

Silicone sealant compositions No. 20 to No. 24 were prepared each by uniformly blending 100 parts of the same dimethylpolysiloxane as used in Example 1, 10 parts of the same fumed silica filler also as used in Example 1, 0.2 part of dibutyltin dioctoate, 5 parts of methyl triacetoxysilane and 0.2 part of one of the surface active agents indicated in Table 2 below. The test for the surface stain by prolonged outdoor exposure was undertaken in the same manner as in Example 1 and the results are given in Table 2. Further, the composition No. 23 was tested for the strength of adhesive bonding in the same manner as in Example 1 to find that the bonding of the cured composition was very firm on the substrates of glass and aluminum not only as cured but also after dipping in water.

TABLE 2

| Composition No. | Surfactant | Surface stain after |  |  |
|---|---|---|---|---|
|  |  | 1 month | 3 months | 6 months |
| 20 | I | A | A | A |
| 21 | II | A | A | B |
| 22 | III | A | B | C |
| 23 | X | A | B | C |
| 24* | XI | B | C | D |

*Comparative example

EXAMPLE 3

Silicone sealant compositions No. 25 to No. 41 were prepared each by uniformly blending 60 parts of a dimethylpolysiloxane terminated at both molecular chain ends with hydroxy groups each directly bonded to the terminal silicon atom and having a viscosity of 500 centistokes at 25° C., 40 parts of a calcium carbonate filler, a surface active agent indicated in Table 3 below in an amount also indicated in the same table and 25 parts of a mixture of cyclic organopolysiloxanes composed of 95% by weight of a first cyclic polysiloxane expressed by the formula

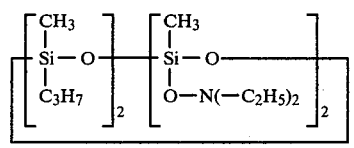

and 5% by weight of a second cyclic polysiloxane expressed by the formula

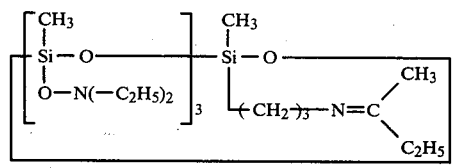

Each of the above prepared silicone sealant compositions was subjected to the test for the surface stain in the same manner as in Example 1 to give the results shown in Table 3.

Further, the mechanical properties of the cured rubbery elastomer of each of the above prepared sealant compositions were examined with the test specimen prepared by curing the composition on a substrate of glass plate for 7 days in an atmosphere of 55% relative humidity at 20° C. The mechanical properties were measured either directly after the above curing procedure or after dipping of the cured product in water at 50° C. for 5 days. The results are shown in Table 4 below.

TABLE 3

| Composition No. | Surfactant, parts |  | Surface stain after |  |  |
|---|---|---|---|---|---|
|  |  |  | 1 month | 3 months | 6 months |
| 25 | I, | 0.2 | A | A | A |
| 26 | I, | 0.5 | A | A | A |
| 27 | I, | 1.0 | A | A | A |
| 28 | II, | 0.2 | A | B | C |
| 29 | II, | 0.5 | A | A | B |
| 30 | II, | 1.0 | A | A | B |
| 31 | III, | 0.2 | A | B | C |
| 32 | III, | 0.5 | A | B | C |
| 33 | III, | 1.0 | A | B | C |
| 34 | X, | 0.2 | A | B | C |
| 35 | X, | 0.5 | A | B | C |
| 36 | X, | 1.0 | A | B | B |
| 37* | VI, | 1.0 | C | D | E |
| 38* | VI, | 5.0 | C | D | E |
| 39* | VII, | 1.0 | B | C | D |
| 40* | VII, | 5.0 | B | C | D |
| 41* | VIII, | 5.0 | A | B | C |

*Comparative example

TABLE 4

| | Composition No. | Tensile modulus, kg/cm$^2$, at elongation of | | Tensile strength, maximum, kg/cm$^2$ | Elongation at break, % | Cohesive destruction, % |
|---|---|---|---|---|---|---|
| | | 50% | 150% | | | |
| Initial | 25 | 1.5 | 2.1 | 3.7 | 1180 | 100 |
| | 26 | 1.5 | 2.2 | 6.9 | 1150 | 100 |
| | 27 | 1.6 | 2.1 | 7.1 | 1190 | 100 |
| | 29 | 1.6 | 2.2 | 7.3 | 1160 | 100 |
| | 35 | 1.5 | 2.2 | 7.0 | 1100 | 100 |
| | 31 | 1.5 | 2.1 | 6.8 | 1080 | 100 |
| | 32 | 1.5 | 2.2 | 7.2 | 1140 | 100 |
| | 33 | 1.5 | 2.2 | 6.8 | 1070 | 100 |
| | 20* | 1.5 | 2.2 | 7.2 | 1130 | 100 |
| | 37* | 1.3 | 2.0 | 6.2 | 1000 | 0 |
| | 38* | 1.2 | 1.9 | 4.1 | 720 | 0 |
| After dipping in water | 25 | 1.4 | 2.0 | 6.8 | 1230 | 100 |
| | 26 | 1.5 | 2.0 | 6.8 | 1200 | 100 |
| | 27 | 1.5 | 2.1 | 7.0 | 1210 | 100 |
| | 29 | 1.4 | 2.0 | 7.0 | 1200 | 100 |
| | 35 | 1.4 | 2.0 | 7.0 | 1190 | 100 |
| | 31 | 1.4 | 2.0 | 7.0 | 1200 | 100 |
| | 32 | 1.5 | 2.1 | 6.9 | 1150 | 100 |
| | 33 | 1.4 | 2.0 | 6.9 | 1140 | 100 |
| | 20* | 1.4 | 2.1 | 7.3 | 1290 | 100 |
| | 37* | 1.3 | 2.0 | 5.6 | 940 | 0 |

TABLE 4-continued

| Composition No. | Tensile modulus, kg/cm², at elongation of | | Tensile strength, maximum, kg/cm² | Elongation at break, % | Cohesive destruction, % |
| --- | --- | --- | --- | --- | --- |
| | 50% | 150% | | | |
| 38* | 1.1 | 1.8 | 3.2 | 460 | 0 |

*Comparative example

What is claimed is:

1. A silicone sealant composition insusceptible to stain on the surface of a cured rubbery elastomer thereof which comprises:
   (a) 100 parts by weight of a diorganopolysiloxane blocked at both molecular chain ends each with a hydroxy group directly bonded to the silicon atom;
   (b) from 0.1 to 25 parts by weight of an organosilicon compound having at least 2 hydrolyzable groups bonded to the silicon atoms per molecule on an average;
   (c) from 1 to 400 parts by weight of a filler;
   (d) optionally, up to 5 parts by weight of a curing catalyst, and
   (e) from 0.01 to 5.0 parts by weight, per 100 parts by weight of the total amount of the components (a) to (d) above, of a surface active agent having, in a molecule, at least one fluorine atom.

2. The silicone sealant composition as claimed in claim 1 wherein the surface active agent as the component (e) is an amphoteric surface active agent having, in a molecule, at least one fluorine atom.

3. The silicone sealant composition as claimed in claim 2 wherein the amphoteric surface active agent is a compound represented by the general formula

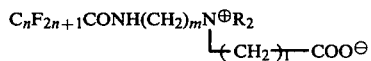

in which R is a monovalent organic group, l and m are each zero or a positive integer and n is a positive integer.